United States Patent [19]

Ida et al.

[11] 4,428,256
[45] Jan. 31, 1984

[54] GENEVA GEAR APPARATUS FOR DRIVING AN INDEX TABLE

[75] Inventors: Jinsei Ida, Sayama; Yoshio Hagimoto, Niiza; Tsutomu Fujita, Kawagoe, all of Japan

[73] Assignee: Honda Giken Kogyo Kabushiki Kaisha, Tokyo, Japan

[21] Appl. No.: 279,218

[22] Filed: Jun. 30, 1981

[30] Foreign Application Priority Data

Jul. 3, 1980 [JP] Japan ............... 55-90004

[51] Int. Cl.³ .................................. B23Q 3/157
[52] U.S. Cl. ........................... 74/820; 29/26 A; 29/568
[58] Field of Search ........... 74/820, 827; 90/15.1, 90/56; 29/26 A, 568

[56] References Cited

U.S. PATENT DOCUMENTS 2,918,828  12/1959  Dexter ..................... 74/820
3,750,494   8/1973  Rice ....................... 74/820

Primary Examiner—Henry Jaudon
Attorney, Agent, or Firm—Armstrong, Nikaido, Marmelstein & Kubovcik

[57] ABSTRACT

An apparatus for driving an index table which includes a first shaft, an index table rotatably mounted on the first shaft having grooves therein forming a Geneva gear and a mechanism for driving the table in rotation including a drive motor, a second shaft driven by the motor, a crank mounted on the second shaft, and a Geneva pin mounted on the crank. The grooves have force bearing walls which include straight portions and sector portions. The Geneva pin is engaged in the grooves in the table to effect stepwise rotation of the table to equispaced, predetermined angular positions. The second shaft and the grooves are spaced from each other such that the distance from the axis of the second shaft to the circumferential surface of the pin is less than the distance from the axis of the shaft to the straight portions of the force bearing walls of the grooves. The sector portions of the force bearing walls of the grooves are recessed such that the distance from the axis of the second shaft to the circumferential surface of the pin is equal to the distance from the axis of the second shaft to the sector portions of the force bearing walls of the grooves. Thus the circumferential surface of the pin transfers from bearing against the walls of the straight portion to bearing against the walls of the recessed sector portion prior to the index table finishing rotation to one of the predetermined angular positions. The index table thereafter completes rotation to the predetermined angular position powered solely by its inertia.

4 Claims, 7 Drawing Figures

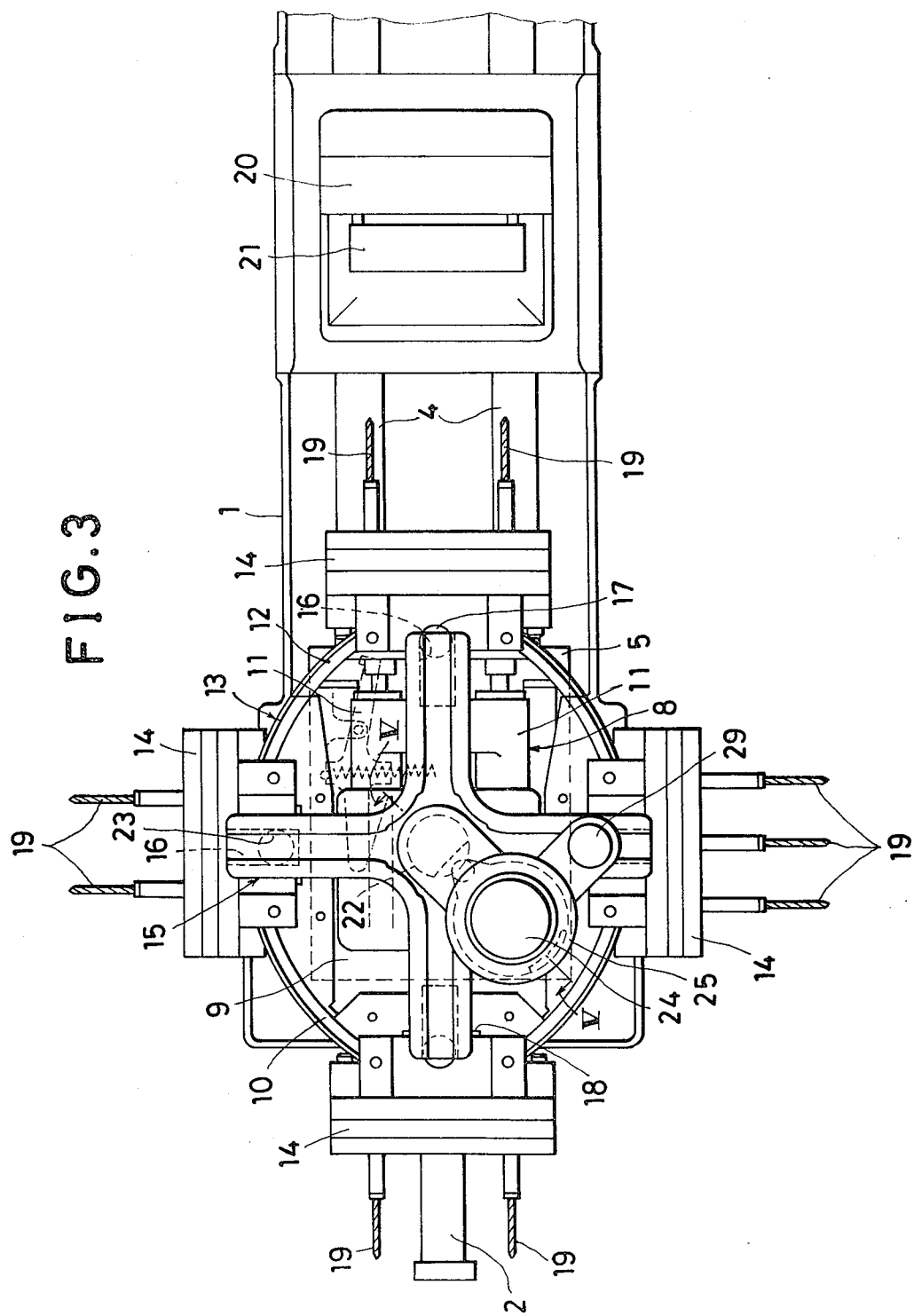

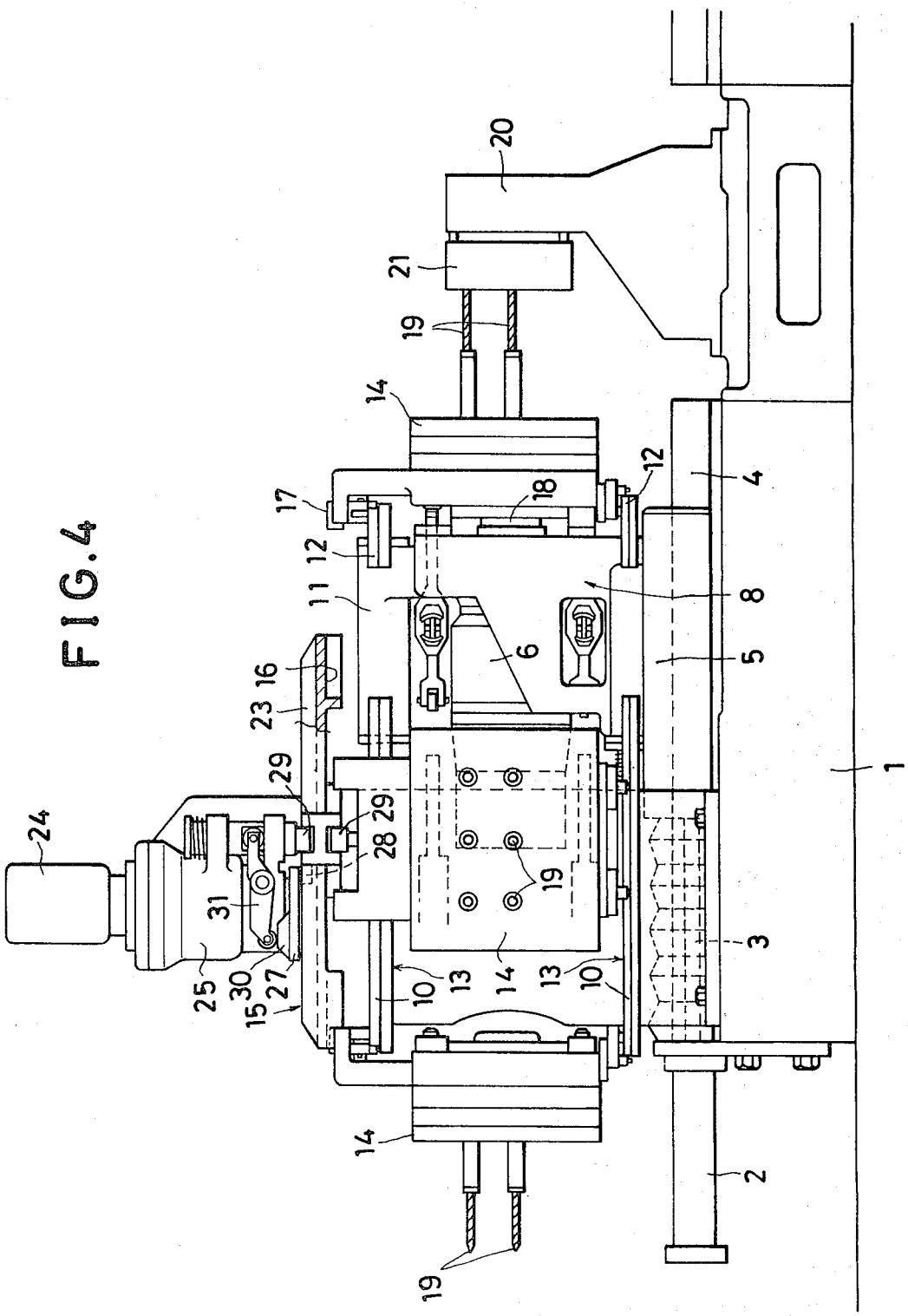

GENEVA GEAR APPARATUS FOR DRIVING AN INDEX TABLE

BACKGROUND OF THE INVENTION

This invention relates to a Geneva gear driving apparatus for an index table which can be used in a replaceable gang head machine tool.

Various Geneva gear driving apparatuses are known in the art. For example, a driving apparatus for an index table in a replaceable gang head machine tool is shown in U.S. Pat. No. 4,216,572. This apparatus is constructed and operates as shown diagrammatically in FIG. 1.

A Geneva pin c is connected to a driving shaft a through a crank b. The pin c is engaged in the Geneva gear grooves e in an index table d. The grooves have force bearing walls comprising straight portions and sector portions. The table d is rotated to a predetermined angular position (through an angular turning of 90° in the illustrated example) upon each rotation of the driving shaft a. It is usual with this type of apparatus that the distance between the pin c and the axis of the driving shaft a is set to be equal to the distance L between the axis of the driving shaft a and the centerline of the straight portion of the groove e with the circumferential surface of pin c bearing against the force bearing walls of the groove e. When the driving shaft a and the crank b are rotated, the pin c powers the rotation of the index table d by bearing against the straight portions of the groove e. When the table d reaches the desired predetermined angular position, the pin c transfers from a straight portion of groove e to a sector portion and consequently, the driving of the table d by the pin c is discontinued The above-described apparatus has a problem when a large mass article such as a gang head or the like is carried by the table d. When the pin c transfers from a straight portion of groove e to a sector portion, the table d continues to rotate because of the inertia of the large mass being carried. A positioning member f such as a positioning pin or the like has been provided in prior art apparatuses to prevent such excessive rotation. The pin f is brought into engagement with one of the grooves e in the table d when the table reaches the desired angular position. This has been known as a Geneva stop mechanism. However, the positioning member f can be damaged by the stress generated upon engagement with the groove because of the inertial force of the table and the large mass article carried thereon. The table d can also be undesirably stressed. Additionally, an inaccuracy in the position of stopping of the table can result.

An object of the present invention is to provide a Geneva gear driving apparatus for an index table which will smoothly and accurately drive the index table between desired, predetermined angular positions.

It is a further object to provide an apparatus which utilizes the inertia of a moving index table carrying a large mass article to complete the rotation of the table to desired, predetermined angular positions.

It is a yet further object to provide an apparatus which avoids overstressing a positioning pin which holds the index table at a desired, predetermined angular position.

It is a still further object to provide an apparatus which is adjustable for different-mass articles to be carried by an index table to desired, predetermined angular positions.

In accordance with the above objects and others which will become apparent to those of skill in the art upon reading the description give hereinbelow, the present invention is an apparatus for driving an index table comprising a first shaft;

an index table rotatably mounted on the first shaft, the table having grooves therein forming a Geneva gear, the grooves having force bearing walls comprising straight portions and sector portions; and means for driving the table in rotation including a drive motor, a second shaft driven by the motor having an axis, a crank mounted on the second shaft, and a Geneva pin mounted on the crank having an axis and a circumferential surface, the pin being engaged in the grooves in the table to effect stepwise rotation of the table to equispaced, predetermined angular positions; wherein the second shaft and the grooves are spaced from each other such that the distance from the axis of the second shaft to the nearest portion of the circumferential surface of the pin is less than the distance from the axis of the shaft to the straight portions of the force bearing walls of the grooves and wherein the sector portions of the force bearing walls of the grooves are recessed such that the distance from the axis of the second shaft to the nearest portion the circumferential surface of the pin is equal to the distance from the axis of the second shaft to the sector portions of the force bearing walls of the grooves, so that the circumferential surface of the pin transfers from bearing against the wall of a straight portion to bearing against the wall of a recessed sector portion of the groove prior to the index table finishing rotation to one of the predetermined angular positions, and the index table completes rotation to the predetermined angular position powered solely by its inertia.

Additionally, the apparatus can further comprise a vertically movable positioning pin positioned and aligned to engage one of the grooves by entering the straight portion thereof when the index table is at the predetermined angular position.

An adjusting means mounting the Geneva pin on the crank for adjusting the distance between the axis of the Geneva pin and the axis of the second shaft can be provided.

The adjusting means can comprise a bushing rotatably mounted in the crank having an eccentric opening therein in which the Geneva pin is mounted.

BRIEF DESCRIPTION OF THE DRAWINGS

FIG. 3 is a top plan view thereof, FIG. 4 is a side view of the machine tool of FIG. 2 where one of the gang heads is selected for operation.

DETAILED DESCRIPTION OF THE INVENTION

Figure 1:
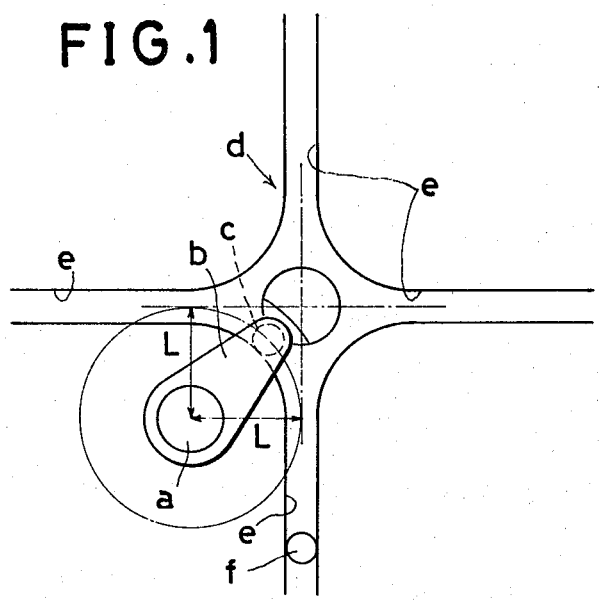
FIG. 1 is a dragrammatic view of a conventional Geneva gear apparatus.

One embodiment of the present invention is explained here-in-below with reference to the accompanying drawings.

FIGS. 2 to 7 show one embodiment of the present invention as utilized applied in an index table of a replaceable gang head machine tool. As shown clearly in FIGS. 2 and 3, the machine tool comprises a machine base 1 and a slide table 5 mounted thereon. The slide table 5 is connected to a piston rod 3 of a cylinder 2 and is movable forwards and rearwards along on a pair of guide rails 4 laid on the machine base 1 by the action thereof. A working unit 8 is fixedly mounted on the slide table 5 and includes a driving motor 6 and a frontward driving shaft 7 coupled to the motor 6. Two upper and lower annular rails 13, 13 encircle the working unit 8. Each of upper and lower annular rails 13, 13 comprises a rear stationary rail 10 fixed to a supporting frame 9 on the machine base 1 and a front movable rail 12 connected to the slide table 5 through a pair of air cylinders 11, 11. A plurality of gang heads 14 are supported on the upper and lower annular rails 13, 13. In the embodiment shown, four gang heads 14 are disposed at equal angular intervals of 90° around the unit 8.

An index table 15 is provided above the upper annular rail 13 and is engaged, at its lower surface, with each gang head 14 through a groove 16 and a pin 17. When the table 15 is intermittently rotated 90°, the gang heads 14 turn with it on the annular rails 13, 13. As a result, any one of the gang heads 14 is conveyed one after another onto the movable rails 12, 12.

After this conveying operation, the slide table 5 is advanced. The movable rails 12, 12 are held immobile in their original positions by the action of the air cylinders 11, 11. The driving shaft 7 on the front side of the working unit 8 which moves forwards along with the table 5 is brought into a splined engagement with a central common operation shaft 18 provided on the rear surface of the gang head 14 on the rails 12, 12. This splined engagement provides the power connection for the tool spindles 19 which are provided on the front surface of the gang head 14. The selected head 14 is moved forwards together with the movable rails 12, 12 as shown in FIG. 4. A workpiece 21 attached to a jig table 20 provided in front of the head 14 can then be worked upon by the machine tool.

The apparatus for driving an index table according to this invention the above described replaceable gang head machine tools is explained in detail below.

Figure 5:
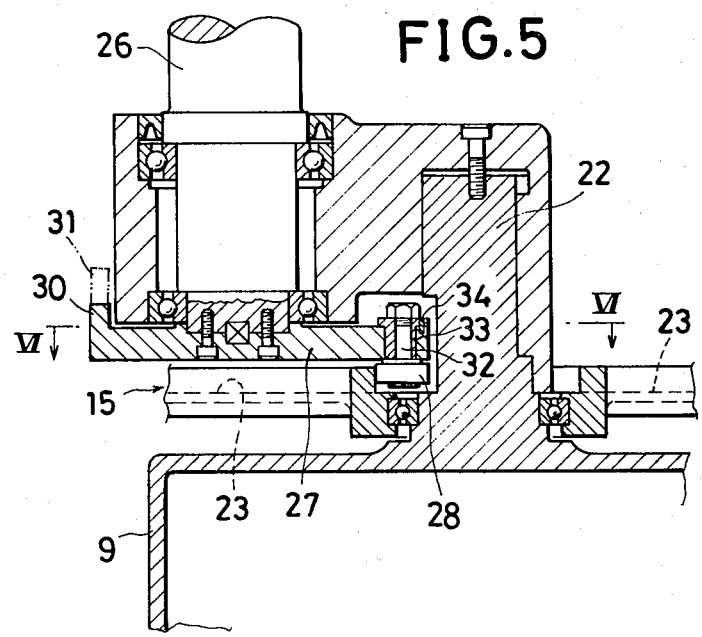
FIG. 5 is an enlarged, partial sectional view taken along the line V—V in FIG. 3 showing an embodiment of the present invention.

As shown clearly in FIG. 5, the index table 15 is rotatably supported on a supporting shaft 22 provided on the upper surface on the supporting frame 9. The table 15 has in its upper surface four grooves 23, 23 of Geneva gear type.

Each groove 23 has force bearing walls comprising straight portions 40 and sector portions 42.

A driving shaft 26 connected through a reduction gear 25 to a driving motor 24 (shown in FIG. 2), is arranged alongside of shaft 22. A Geneva pin 28 comprising a roller arranged to engage the grooves 23 is connected through a crank 27 to the driving shaft 26.

Figure 2:
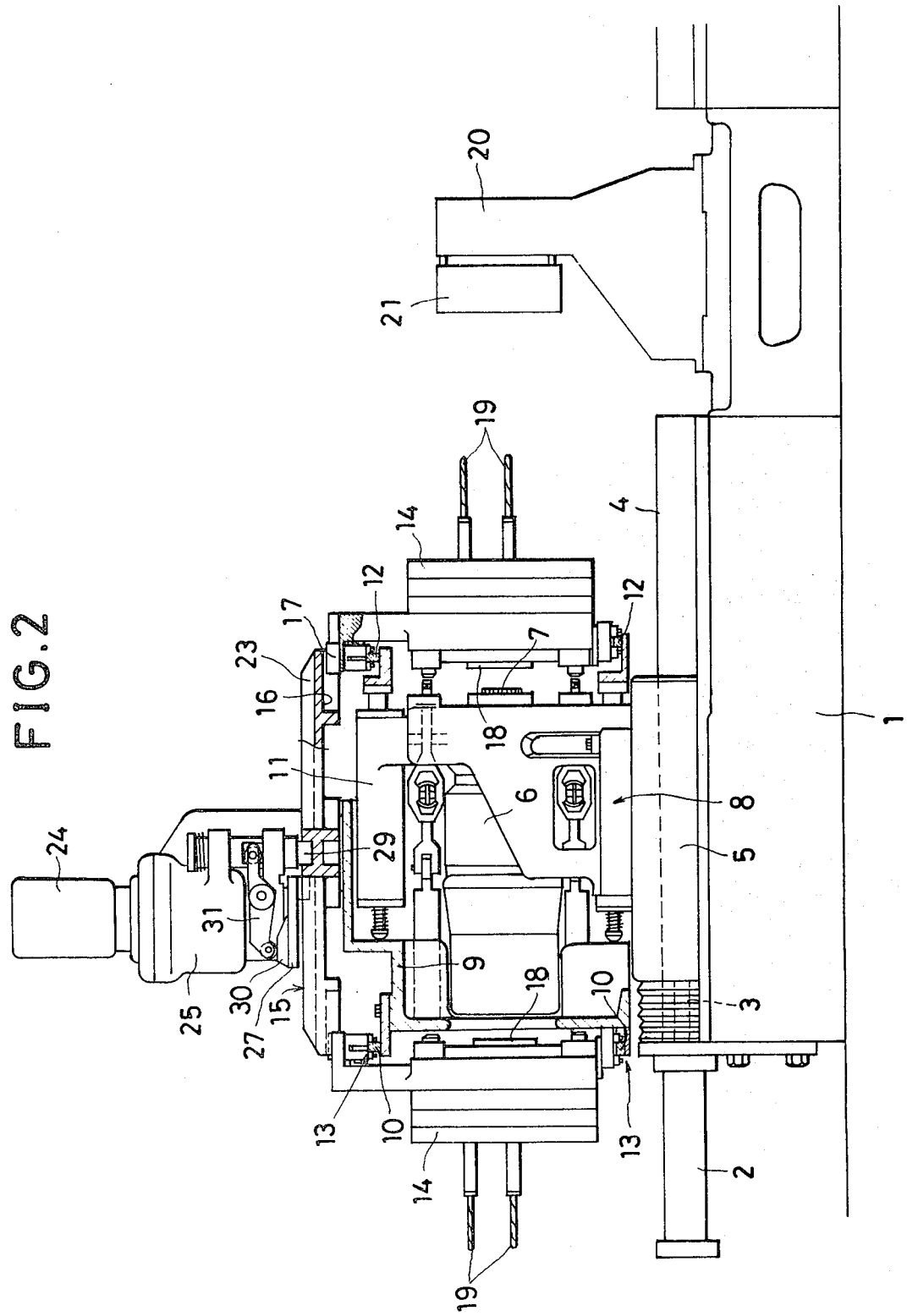
FIG. 2 is a side view, partly in section, of a replaceable gang head machine tool utilizing an embodiment of the present invention.
Figure 6:
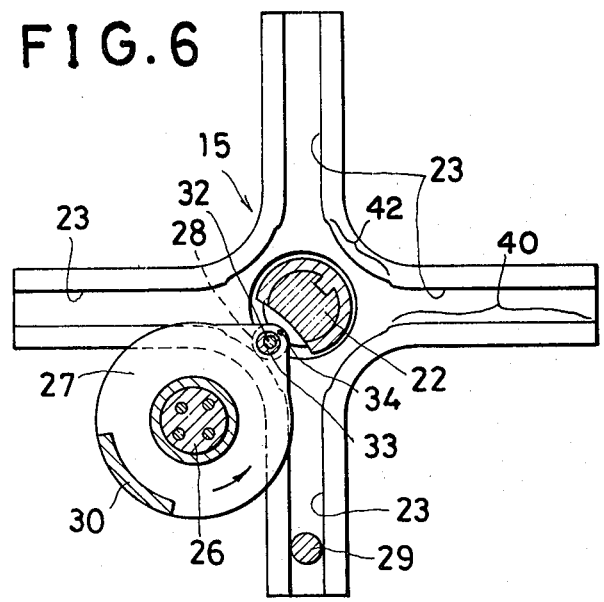
FIG. 6 is a sectional view taken along the line VI—VI in FIG. 5.

A positioning pin 29 is provided which serves as positioning member for positioning the table by being brought into engagement with the groove 23a when the table 15 reaches a desired, predetermined angular position brought about by a predetermined angular rotation thereof, for instance, by an angular turning of 90°. The positioning pin 29 is movable upwards and downwards by a lever 31 engaged with a cam 30 formed on the crank 27 as shown in FIG. 2. This mechanism is so arranged that as the table 15 reaches the predetermined angular position, the pin 29 is simultaneously moved downwards from its upper inoperative position to engage the groove 23 of the table 15. The above arrangement of a positioning pin is not especially different from a Geneva stop mechanism hitherto known.

In the present invention, a distance X between the center of the pin 28 and the center of the driving shaft 26 is set to be slightly shorter than a distance L between the center of driving shaft 26 and the center line of the groove 23 at the predetermined angular position of the table 15. That is, the driving shaft 26 and the grooves 23 are spaced from each other such that the distance from the axis of the driving shaft 26 to the nearest portion of the circumferential surface of the pin 28 is less than the distance from the axis of the shaft 26 to the straight portions of the force bearing walls of the grooves 23. The sector portions of the walls of the grooves 23 are recessed such that the distance from the axis of shaft 26 to the nearest portion of the circumferential surface of the pin 28 is equal to the distance from the axis of the shaft to the sector portions of the walls.

Figure 7:
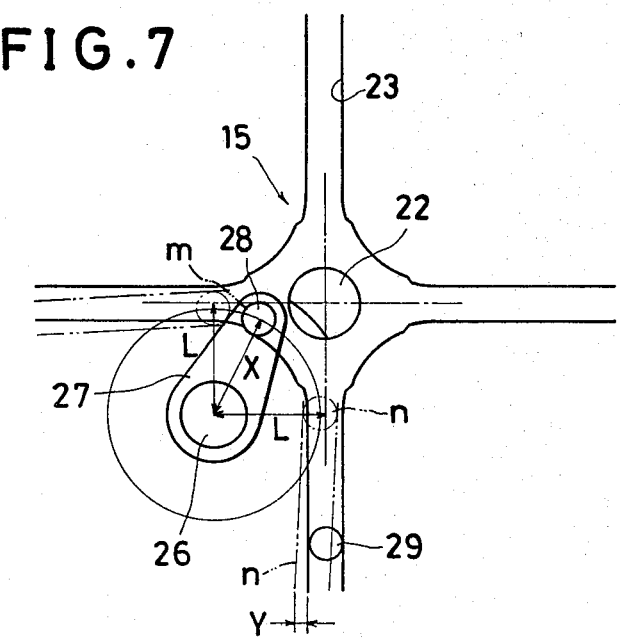
FIG. 7 is a diagrammatic view of the operation of the present invention.

As a result of this arrangement, when the driving shaft 26 is driven from a first desired position of the index table 15 shown by solid lines in the upper left hand side of FIG. 7, the Geneva pin 28 reaches its driving start position m at which it starts to push the wall surface of the groove 23 and its driving end position n at which it leaves the groove 23 sooner than in a conventional Geneva gear driving apparatus. Consequently, the table 15 completes rotating powered by the inertia of the table 15 and gang heads 14 carried thereon through a distance Y between the driving end position n of the pin 28 shown by dotted lines and the second desired, predetermined angular position shown by solid lines in the lower portion of FIG. 7. In other words, the circumferential surface of the pin 28 which powers the rotation of the table 15 by pushing against the walls of the straight portions transfers from bearing against the walls of the straight portion to bearing against the wall of a recessed sector portion prior to the index table 15 finishing rotation to one of the predetermined angular positions. Thus, the table 15 completes rotation to the second position powered solely by its inertia. Consequently, when the table 15 reaches the second position, the positioning pin 29 can be brought into engagement with the groove 23 to stop and hold the table without being overly stressed. The table 15 is positioned smoothly in the second desired position. Thus, the gang head 14 which is in engagement with the table 15 can be given an accurate conveying to the movable rails 12, 12.

The turning distance Y of the table 15 by inertia can vary with a change in weight of the gang heads 14 engaged therewith. Accordingly, in order that the adjustment can be made to compensate for this, the Geneva pin 28 is attached via a pin rod 32 to the crank 27 through an eccentric bushing 33 so that the distance X between the axis of the pin 28 and the axis of the driving shaft 26 can be adjusted by a turning adjustment of the bush member 33. A positioning pin 34 is provided to hold the bushing 33 in place.

The present invention may be embodied in other specific forms without departing from the spirit or essential characteristics thereof. The presently disclosed embodiment is, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for driving an index table comprising:
   a first shaft;
   an index table rotatably mounted on the first shaft, the table having grooves therein forming a Geneva gear, the grooves having force bearing walls comprising straight portions and sector portions; and
   means for driving the table in rotation including a drive motor, a second shaft driven by the motor an axis, a crank mounted on the second shaft, and a Geneva pin mounted on the crank having an axis and a circumferential surface, the pin being engaged in the grooves in the table to effect stepwise rotation of the table to equispaced, predetermined angular posisions; wherein
   the second shaft and the grooves are spaced from each other such that the distance from the axis of the second shaft to the nearest portion of the circumferential surface of the pin is less than the distance from the axis of the second shaft to the straight portions of the force bearing walls of the grooves and wherein the sector portions of the force bearing walls of the grooves are recessed such that the distance from the axis of the second shaft to the nearest portion of the circumferential surface of the pin is equal to the distance from the axis of the second shaft to the sector portions of the force bearing walls of the grooves,
   so that the circumferential surface of the pin transfers from bearing against the wall of a straight portion to bearing against the wall of a recessed sector portion of the groove prior to the index table finishing rotation to one of the predetermined angular positions, and the index table completes rotation to the predetermined angular position powered solely by its inertia.

2. An apparatus as claimed in claim 1 further comprising a vertically movable positioning pin positioned and aligned to engage one of the grooves by entering the straight portion thereof when the index table is at the predetermined angular position.

3. An apparatus as claimed in one of claims 1 or 2, further comprising adjusting means mounting the Geneva pin on the crank for adjusting the distance between the axis of the Geneva pin and the axis of the second shaft.

4. An apparatus as claimed in claim 3 wherein said adjusting means comprises a bushing rotatably mounted in the crank having an eccentric opening therein in which the Geneva pin is mounted.

* * * * *